Jan. 13, 1948.  C. REBUS  2,434,250
ADVERTISING DISPLAY STAND IN THE FORM OF A GLOBE
Filed Feb. 20, 1946

INVENTOR
Carl Rebus
by
E. H. Fetherstonhaugh
ATTORNEY

Patented Jan. 13, 1948

2,434,250

UNITED STATES PATENT OFFICE 2,434,250

ADVERTISING DISPLAY STAND IN THE FORM OF A GLOBE

Carl Rebus, Edmonton, Alberta, Canada

Application February 20, 1946, Serial No. 648,974
In Canada November 20, 1944

4 Claims. (Cl. 40—126)

The invention relates to advertising display stands as described in the present specification and illustrated in the accompanying drawings that form a part of the same.

The invention consists essentially in the novel features of construction as pointed out broadly and specifically in the claims for novelty following a description containing an explanation in detail of acceptable forms of the invention.

The objects of the invention are to device a display stand that will be pleasing to the eye and which will attract the attention of persons, through depicting a scene with an object or objects moving in front thereof in a to and fro direction or in a continuous circular path therearound, to construct a stand that will be particularly adaptable for advertising transportation systems such as airlines, steamship lines, bus lines and other types of conveyance and which illustrates by actual visual means the routes to be taken and the method of travelling; to furnish illuminating means to the stand for denoting stations, stop offs, cities, towns or other sites through which the conveyance system pass or are in affiliation; and generally to provide an advertising display stand that will be durable in construction, using little power to operate and made of comparatively few parts.

In the drawings.

Like numerals of reference indicate corresponding parts in the various figures.

Figures 1, 2, 3, 4:
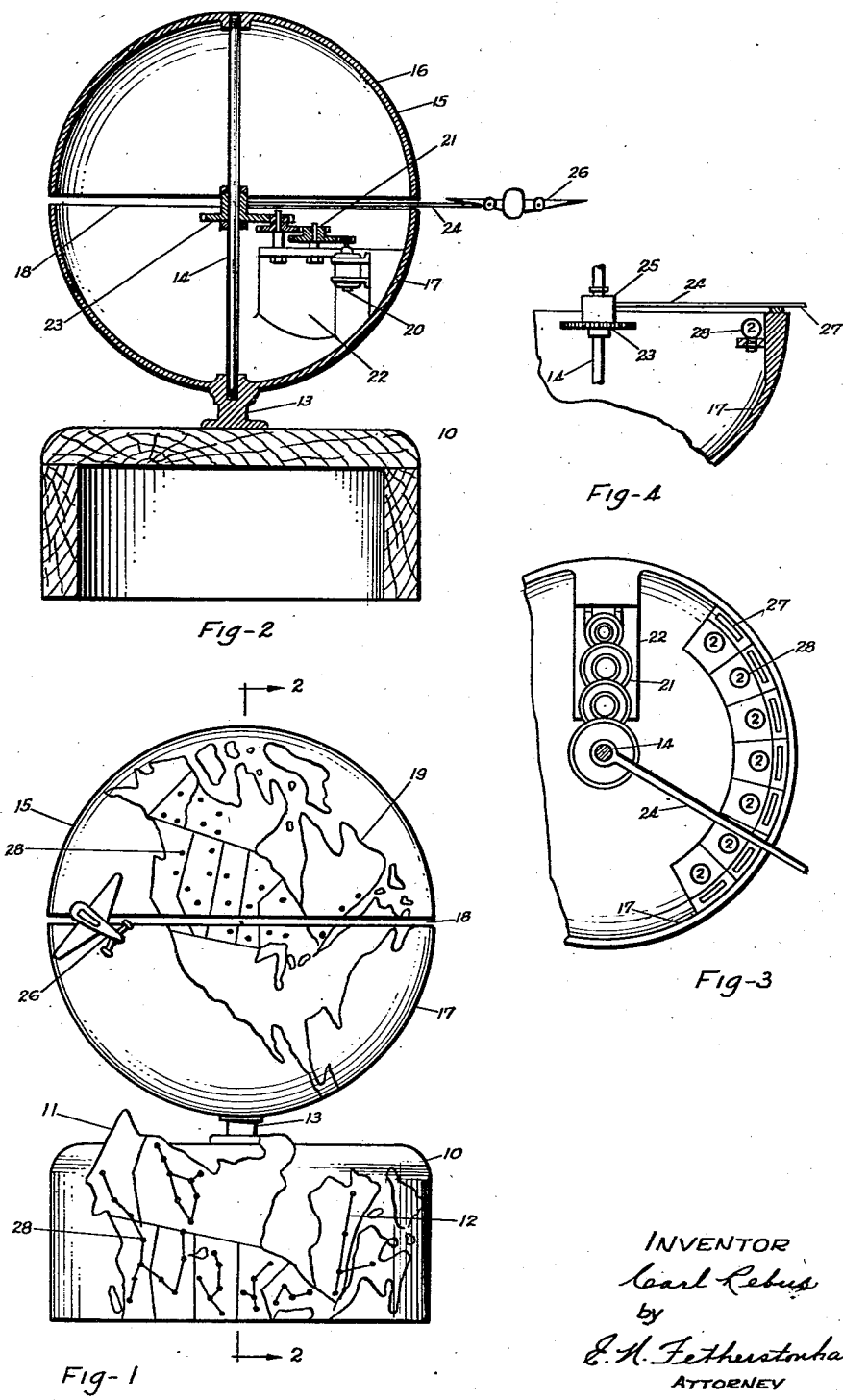
Figure 1 is an elevation of the display stand.
Figure 2 is a vertical sectional view as taken on the lines 2—2 in Figure 1.
Figure 3 is an enlarged fragmentary sectional plan view of the stand.
Figure 4 is an enlarged fragmentary side sectional view depicting an acceptable method of illumination.

Referring to the drawings, the advertising display stand is formed of a base as indicated by the numeral 10, and made of any suitable material and around which or around a portion thereof is mounted a map 11 preferably cut out of flex glass and formed to the curvature of the earth and provided with luminated air routes 12.

The globe socket 13 is mounted on the top of the base 10 and secured thereto or may be integral therewith and in this socket is secured the shaft 14. The globe 15 is supported by the socket 13 and the shaft 14 and is preferably made of an upper section 16 and a lower section 17. The two sections are suitably spaced apart to form a circular channel 18 and the exterior of the globe is provided with suitable configurations 19 representing a map of the North American continent, the world or other portions of the earth that is served by the transportation line advertised by the display stand.

The interior of one of the globe sections forms a housing for the electric motor 20 operating the intermeshing gears 21, a bracket 22 supporting the motor and the gear mechanism and in turn secured to the wall of the globe section. The intermeshing gears operate the main gear 23 which is journalled on the shaft 14 while the driven shaft 24 is secured to the sleeve portion 23 of the main gear 23 and extends outwardly through the channel 18 is formed by the globe sections and therebeyond. An aeroplane or other conveyance 26 is secured to the free end of the driven shaft 24 and is adapted to be rotated around the globe.

The circumferential edge of one of the globe sections is provided with a plurality of contact switches 27 suitably connected to electrical bulbs 28 situated at various locations on the map to mark off the various sites of the air routes and are so arranged that they will light up as the model aircraft passes the locale as it is being pulled around the globe.

While the above description relates to the manner in which the aircraft is propelled around the globe, it is self apparent that the globe could be made to rotate while the aircraft remain stationary without in any way departing from the essential features of the display stand.

What I claim is:

1. In an advertising display stand, a base, a map mounted on one side of the said base, a globe formed of two sections and having a circumferential space therebetween, a fixed shaft projecting upwardly from said base and into said globe and supporting the latter, a motor supported in one of said globe sections, intermeshing gears supported in one of said globe sections and operated by said motor, a main gear journalled on said fixed shaft and operated by said intermeshing gears, a driven shaft connected to said main gear and projecting through the space formed by globe sections and extending therebeyond, a model aircraft secured to the free end of said driven shaft, and lumination means on said globe and adapted to be controlled through the movements of said aircraft.

2. In an advertising display stand, a base, a map cut out of flex glass and formed to the curvature of the earth and mounted to said base, a globe formed of upper and lower sections and having a space therebetween, a fixed shaft projecting upwardly from said base and into said globe and supporting the latter, a motor supported in one of said globe sections, intermeshing gears supported in one of said globe sections and operated by said motor, a main gear journalled on said fixed shaft and operated by said intermeshing gears, a driven shaft connected to said main gear and projecting through the space formed by said globe sections and extending therebeyond, a model aircraft secured to the free end of said driven shaft, lumination bulbs located on said map and on said globe, a plurality of contact switches located on one of the circumferential edges of one of said globe sections and connected to said lumination bulbs and adapted to be controlled by the movements of the driven shaft.

3. In an advertising display stand, a base, a globe formed of two sections and mounted on said base, a fixed shaft extending from said base and supporting said globe, a movable shaft supported by the said fixed shaft and projecting through the space formed between the globe sections and adapted to be moved therearound, a model aircraft secured to the free end of said movable shaft, lumination means on said globe and adapted to be controlled through the movements of said movable shaft, and means for moving said movable shaft and model aircraft.

4. In an advertising display stand, a base, a globe formed of two sections and having a circumferential space therebetween, a fixed shaft extending from said base and into said globe and supporting the latter, a movable shaft supported by the said fixed shaft and projecting through the space formed between the globe sections and adapted to be moved therearound, a model conveyance secured to the free end of said movable shaft, lumination means on said globe and adapted to be controlled through the movements of said movable shaft, and means for moving said movable shaft and model conveyance.

CARL REBUS.

REFERENCES CITED

The following references are of record in the file of this patent:

UNITED STATES PATENTS

| Number | Name | Date |
| --- | --- | --- |
| 586,339 | Lane | July 13, 1897 |
| 2,128,690 | Burke et al. | Aug. 30, 1938 |